United States Patent
Gallois et al.

(10) Patent No.: US 12,078,050 B2
(45) Date of Patent: Sep. 3, 2024

(54) METHOD FOR CONTROLLING A STATE OF A TUBE

(71) Applicant: VALLOUREC OIL AND GAS FRANCE, Aulnoye-Aymeries (FR)

(72) Inventors: Yann Gallois, Frasnoy (FR); Cyril Blanpied, Saint-Cloud (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 913 days.

(21) Appl. No.: 17/258,341

(22) PCT Filed: Jun. 25, 2019

(86) PCT No.: PCT/EP2019/066766
§ 371 (c)(1),
(2) Date: Jan. 6, 2021

(87) PCT Pub. No.: WO2020/007643
PCT Pub. Date: Jan. 9, 2020

(65) Prior Publication Data
US 2021/0270121 A1    Sep. 2, 2021

(30) Foreign Application Priority Data
Jul. 6, 2018 (EP) ..................... 18305895

(51) Int. Cl.
*E21B 47/00* (2012.01)
*G05B 15/02* (2006.01)
(Continued)

(52) U.S. Cl.
CPC .............. *E21B 47/00* (2013.01); *G05B 15/02* (2013.01); *G06K 7/10297* (2013.01); *G06K 7/1413* (2013.01); *G06K 7/1417* (2013.01)

(58) Field of Classification Search
None
See application file for complete search history.

(56) References Cited

U.S. PATENT DOCUMENTS

| | | | |
|---|---|---|---|
| 7,788,054 B2 * | 8/2010 | Newman | ............. G01B 21/30 73/1.01 |
| 8,985,156 B2 | 3/2015 | Drouin et al. | |

(Continued)

FOREIGN PATENT DOCUMENTS

| | | |
|---|---|---|
| CN | 202970680 U | 6/2013 |
| CN | 102828709 B | 2/2015 |

(Continued)

OTHER PUBLICATIONS

International Search Report issued Jul. 25, 2019 in PCT/EP2019/066766 filed Jun. 25, 2019, 4 pages.

(Continued)

*Primary Examiner* — Peter J Macchiarolo
*Assistant Examiner* — Jermaine L Jenkins
(74) *Attorney, Agent, or Firm* — Oblon, McClelland, Maier & Neustadt, L.L.P.

(57) ABSTRACT

A method for controlling a state of a first tube, said first tube being intended to be integrated in an extraction structure, a first server managing a digital descriptor of the first tube, said digital descriptor having a first set of data stored on at least a first memory, said first set of data comprising at least: one identification number of the first tube and; a completion status and a planification status, the method includes generating a first request to a first server from a computer located near the first tube acquiring the identification number in order to generate an inventory status of the first tube, acquiring a first value of a completion status of the first tube, acquiring a second value of a planification status of the first tube, and generating at least one alert when the first or the second value is equal to a predefined state value.

16 Claims, 4 Drawing Sheets

(51) Int. Cl.
*G06K 7/10* (2006.01)
*G06K 7/14* (2006.01)

(56) References Cited

U.S. PATENT DOCUMENTS

| | | | |
|---|---|---|---|
| 9,394,751 B2* | 7/2016 | Magnuson | E21B 17/006 |
| 10,073,446 B1* | 9/2018 | Snow | E21B 17/006 |
| 10,685,335 B2 | 6/2020 | Buca et al. | |
| 2014/0130928 A1 | 5/2014 | Drouin et al. | |

FOREIGN PATENT DOCUMENTS

| | | | |
|---|---|---|---|
| CN | 103827437 B | 5/2017 | |
| CN | 206601728 U | 10/2017 | |
| CN | 107636702 A | 1/2018 | |
| FR | 2842245 A1 * | 1/2004 | E21B 17/00 |
| GB | 2472929 A | 2/2011 | |
| WO | WO 2013/120209 A1 | 8/2013 | |

OTHER PUBLICATIONS

Anonymous, "Tubular Management Services," Retrieved from the Internet [URL: https://www.weatherford.com/en/documents/brochure/products-and-services/tubular-running-services/tubular-management-services/], XP055526886, 2013, 12 pages.

Thomas Redlinger, "RFID drill pipe heads offshore," Offshore, XP055526894, Nov. 1, 2011, 17 pages.

Anonymous, "Lakeland Water Utilities Water Materials Specifications," Retrieved from the Internet [URL: https://www.lakelandgov.net/media/1179/v3-water_material_specs.pdf], XP055526898, Jun. 24, 2014, 20 pages.

* cited by examiner

METHOD FOR CONTROLLING A STATE OF A TUBE

FIELD OF THE INVENTION

The invention relates to methods and systems allowing controlling mechanical properties of components before their integration, installation. More precisely, the domain of the invention deals with the follow-up, the monitoring and the control of tubes, casings, liners, tubings and pipes which are used to drill and build wells. More particularly, the invention relates to methods for following-up, monitoring and controlling said components all along their routing to the wells. The domain of the invention also concerns the marking of tubes for their control.

BACKGROUND OF INVENTION

Industrial objects such as tubes and pipes intended to be introduced in a well are following-up by a visual checking and some inspection that should be reported in a computer. The objective, on the site, is to ensure a well assembly of an extraction structure that is built piece by piece in an environment where there are significant constraints.

One difficulty encountered in operations related to wells is that the extraction structure assembly may comprise a lot of changes in the planning of pieces that should be introduced or modifications of pieces themselves. It involves rejects of tubes and increasing back and forth in different sites, for example for repairing a tube or for changing an element of a tube.

Another difficulty remains on the computation of some well parameters such as the mud gain value or the cement volume into the well. These values are updated at each introduction of a piece into the well in order to ensure an assembly in accordance with the constraints of the well. These values may be computed on the base of the information related to the next tube intended to be introduced and information related to the extraction structure assembly that is already into the well. Currently, an operator controls the tube, enters data related to the tube in a computer and records specific values such as the diameter, the length of the tube, etc. in order to compute the new values of these well parameters. Some input errors may occur and this operation takes a long time because of the manual process that should be led between the visual checking and the generation of the new values of well parameters.

Solutions using tags on tubes allow implementing a checking of said tubes for inventory purpose or for following-up the tubes when routing between two different sites.

GB201317246 discloses a method for checking identification information and the like for a tube comprising a tag. The tag comprises all data about the tube and the company that manufactured the tube. However, this document fails to disclose a method ensuring that a tube comprised some modifications that could be controlled on all stages of its routing until the well for facilitating visual checking.

WO2009128999 discloses a method for updating data in a well-control system. This document describes the implemented means for updating a central database, but it does not disclose a control of some parameters during the introduction of tubes inside the well for controlling the extraction structure and some parameters of the well.

US2009121895 also describes a solution for reading information on the tube through a tag. But this document fails to disclose a solution where information on the extraction structure or the well may be generated and updated from data that are read on a tube.

GB2472929 discloses a solution where mechanical information on a tube may be accessed by reading a tag on said tube. The method aims to combine information on tubes and their location. This document does not describe how information on tubes may be used for controlling their introduction into a well.

U.S. Pat. No. 8,463,664 also discloses a method for identifying a tube and its location. The method discloses data related to the planning that may be used for facilitating customer order. This document fails to disclose a method where information on a tube is exploited with other pieces of a same extraction structure during their introduction into a well.

Consequently, there is a need to have a method that allows controlling dynamically a tube when it is intended to be introduced on a well.

There is a need for a method ensuring controlling tubes intended to be introduced into a well while maintaining secured operations on tubes and the extraction structure being built. There is a need for a method facilitating acquisition of information on tubes and ensuring the accordance in real time of some values of parameters of the well.

SUMMARY

According to one aspect, the invention concerns a method for controlling a state of a first tube, said first tube being intended to be integrated in an extraction structure, a first server managing a digital descriptor of the first tube, said digital descriptor comprising a first set of data stored on at least a first memory, said first set of data comprising at least:
 one tracking code of the first tube and;
 a completion status and a planification status,
 wherein said method furthermore comprises:
 authenticating the first tube by capturing the tracking code of the first tube;
 generating a first request to a first server from a computer located near the first tube;
 acquiring an identification number in order to generate an inventory status of the first tube;
 acquiring a first value of a completion status of the first tube;
 acquiring a second value of a planification status of the first tube;
 generating at least one alert when the first or the second value is equal to a predefined state value.

One advantage is to gather different status of a tube that can be accessible by a computer any time during all along the life cycle of a tube. Among different status, the invention deals especially with an inventory status, a completion status and a planification status for controlling said tube when it will be introduced into the well. The invention allows controlling if the number of the tube in the sequence match with the previous elements that has been introduced into the well. The invention allows verifying the mechanical features of said tube, taking into account each change in the overall routing process.

Said alert can be a message or pictogram displayed on a user interface. Said alert can be associated to a validation through a user interface by an operator.

In one embodiment, the first set of data comprises at least:
 a first subset of geometrical data comprising at least one of the following features:

an outside diameter; an internal diameter; a weight; a steel grade; a drift diameter; a wall thickness; a minimum wall thickness; an effective length; a material standard, a second subset of junctional component data comprising at least one of the following features:
  a connection type; a joint length total with another interface component;

a third subset of workflow data comprising at least one of the following features:
  a pipe tracking code; a coupling tracking code; a serial number; a contract number indicating the position of the wells; a manufacturer's name; a manufacturing date, a fourth subset of job data comprising at least one of the following features:
  a job reference; a sequential number in a job.

One advantage is to provide access to different types of data to an operator. That allows the operator to control, for instance, that one modification on a tube is compliant with the overall constraints of an extraction structure in a well. This possibility allows reducing the errors when introducing a tube in the well.

In one embodiment, the completion status is given for:
a presence of at least one value in predefined fields of data of the first, the second and the third subsets of data of the first set of data; and/or,
a specific field value of a completion status field in the first set of data.

Controlling a completion status allows verifying that the tube is compliant with the pieces that are directly in contact with. It ensures that the whole extraction structure comprises elements that is planned to be introduced.

In one embodiment, the planification status is given for:
a presence of at least one value in predefined fields of data of the fourth subsets of data of the first set of data; and/or,
a specific value of a feature of the fourth subset of data.

One advantage is to ensure a well planification of each tube that should be introduced into the well. It allows gathering data from each tube in a Tally with data from the job that comprises the planning sequence of the construction of the extraction structure. An advantage is to be sure that a selected tube for the well is a tube that is referred in a Job datasheet. This verification aims to reduce errors when the tubes are selected for their introduction in the well.

In one embodiment, the first set of data comprises a job reference of a job datasheet, said job datasheet comprising a sequence number, wherein the method according to the invention furthermore comprises:
  generating a second request to a first server from a computer located near the first tube;
  extracting a job datasheet including a second set of data relating to a plurality of tubes, said plurality of tubes including the first tube;
  acquiring the sequential number of the first tube from the first set of data;
  comparing the sequential number of the first tube in said job datasheet with a sequential number of:
    another tube of the same job datasheet;
    the first tube being recorded in the first set of data;
  generating an alert when the comparison of both sequential number is inferior or superior to a predefined threshold.

One advantage is to control the order of each piece introduced into the well according to a predefined sequence. The control may be done at any time. When the tube is introduced into the well, the tag can be read automatically by a camera in order to realize a last verification. This system allows reinforcing the compliance of the construction of the extraction structure with the job datasheet constraints.

In one embodiment, the first set of data comprises at least a fourth value of a geometrical feature of said tube, said method defining a geometrical status, said method comprising:
  acquiring a value of the first geometrical feature by a user interface;
  comparing the fourth value of the geometrical feature comprised in the first set of data with the acquired value of the first geometrical feature of the first tube;
  generating a third alert when the comparison of the two fourth values is superior or inferior to a predefined threshold.

One advantage is to compute the mechanical compliance of each tube introduced into the well with reference values. The comparison of geometrical or structural parameters also allows to compute and predict some characteristics of the well that could change with the introduction of a new tube, such as mud gain value.

In one embodiment:
When the first geometrical value is the total length of the first tube, said method defining a length status, the method comprises the steps of:
  Automatically calculating the cumulated length of tubes integrated in the extraction structure which have a sequential number inferior to the sequential number of the first tube;
  Comparing the calculated cumulated length with a reference value recorded in the workflow data;
  Generating an alert when said comparison is superior or inferior to a predefined threshold.

In one embodiment:
When the first geometrical value is the internal diameter of the first tube, said method defining a mud status, the method comprises the steps of:
  Automatically calculating an estimated mud gain value;
  Comparing the calculated estimation of mud gain value with an expected mud gain stored in the workflow data;
  Generating an alert when said comparison is superior or inferior to a predefined threshold.

In one embodiment:
When the first geometrical value is the outside diameter of the first tube, said method defining a cement status, the method comprises the step of:
  Automatically calculating an estimated cement volume to be introduced;
  Comparing the calculated estimation of cement volume with an expected cement volume stored in the workflow data;
  Generating an alert when said comparison is superior or inferior to a predefined threshold.

One advantage is to generate alarms automatically when some controlled parameters are outside of a predefined range of values. This solution informs an operator of the corrections to lead or allows interpreting the generated indicators as a risk that could be integrated in the extraction structure design.

In one embodiment, the acquisition of the data from the first memory comprises:
  reading a tracking code on the surface of the first tube by activating an optic sensor of a radio antenna;

generating a request to a first server in order to extract at least a subset of the first set of data from the first memory;

receiving the first set of data on a user device through a wireless interface.

In one embodiment, the first server manages a plurality of memories in a cloud architecture, wherein the second set of data is stored on at least the first memory of the plurality of memories. In one embodiment, the first server periodically transmits the first set of data to a central server.

In one embodiment, the method comprises:
Reading a tracking code on said first tube with an optic sensor or a radio antenna;
modifying a data from the first subset of geometrical data or from the second subset of junction data of the first tube with a user interface;
recording the modified data associated to a timestamp in the first memory;
transmitting the modified data associated to the timestamp in a memory managed by the central server, said modified data being associated to the first tube in said memory;
Updating the digital descriptor of the first tube.

In one embodiment, the method comprises a preliminary step of pairing the first set of data with the tracking code.

In one embodiment, the tracking code on the first tube is an identification tags or a marking being arranged on the surface of the first tube.

In another aspect, the invention concerns a method for controlling a state of a well, a first tube being intended to be integrated in an extraction structure present in said well, a first server managing a digital descriptor of the first tube, said digital descriptor comprising a first set of data stored in at least a first memory, said first set of data comprising at least:
one tracking code of the first tube and;
an internal diameter;
wherein said method furthermore comprises:
authenticating the first tube by capturing the tracking code of the first tube;
generating a first request to a first server from a computer located near the first tube;
acquiring a value of the internal diameter of said first tube;
Automatically calculating an estimated mud gain value by taking account of the internal diameter of said first tube and a value issued from the extraction structure present in the well;
Comparing the calculated estimation of mud gain value with an expected mud gain value recorded in the first set of data;
Generating an alert when said comparison is superior or inferior to a predefined threshold.

On advantage is to implement a unique solution driving either the control of tubes or the control of the well. The parameters of tubes that are introduced into the well may be used to compute some parameters on the well. The induced structural or mechanical properties, such as mud or cement properties, of the well resulting from the introduction of a tube may be used to anticipate actions on the rest of the tubes that should be introduced.

In another aspect, the invention concerns a method for controlling a state of a well, a first tube being intended to be integrated in an extraction structure present in said well, a first server managing a digital descriptor of the first tube, said digital descriptor comprising a first set of data recorded in at least a first memory, said first set of data comprising at least:
one tracking code of the first tube and;
an outside diameter;
wherein said method furthermore comprises:
authenticating the first tube by capturing the tracking code of the first tube;
generating a first request to a first server from a computer located near the first tube;
acquiring a value of the outside diameter of said first tube;
Automatically calculating an estimated cement volume using at least the value of the outside diameter of said first tube;
Comparing the calculated estimation of cement volume with an expected cement value recorded in the first set of data;
Generating an alert when said comparison is superior or inferior to a predefined threshold.

One advantage is to generate an accurate indicator on the cement that should be introduced for maintaining the extraction structure. The invention allows computing the value of cement in real time, before each introduction of a tube.

In another aspect, the invention concerns a computer program comprising instructions which, when the program is executed by a computer, cause the computer to carry out the method of the invention.

In another aspect, the invention concerns a system for managing digital descriptors of a plurality of tubes, each tube being intended to be integrated in an extraction structure, said system comprising:
a central server addressing a memory wherein a digital descriptor of a first tube is paired with a tracking code;
at least one local server;
a plurality of tubes located on different areas, each area being equipped with a local network infrastructure allowing establishing a communication between at least a first user computer and a local server;
each tube comprising at least one tracking code on the surface of said tube by activating an optic sensor of radio antenna;
at least one optic sensor or one radio antenna, called first sensor, arranged in each area, said first sensor being configured to capture the tracking code;
a local computer receiving the tracking code and generating a request to a local server, said first local computer furthermore comprises means for:
receiving a first set of data comprising values associated to a tube features;
editing at least one value of a tube feature;
generating an associated timestamp;
transmitting the new value with the associated timestamp to the first server;
a communication interface allowing updating the first set of data managed by the central server, said updated data being recorded in at least one memory archiving the previous data added with the new data associated with the timestamp.

In one embodiment, the system according to the invention is configured to implement the method of the invention.

In another aspect, the invention concerns a tube comprising at least six marks at it surface, each mark representing the same tracking code, a first set of marks being arranged in cylindrical symmetry so that they are spaced substantially 120° angle apart in a first distal portion of the tube, a second set of marks being arranged in cylindrical symmetry so that they are spaced of substantially 120° to each other in a second distal portion of the tube.

One advantage is to facilitate the control of a tube when it is introduced into the well. The camera is arranged so that to read the tracking code automatically on the surface of a tube. A motion detector may configure in order to detect automatically the introduction of a new tube. The control of the different status and structural and geometrical parameters of the tube and of the well are conduced automatically with this configuration.

In one embodiment:
the first set of marks comprises another set of three marks being arranged in cylindrical symmetry so that they are spaced substantially 120° angle apart in a first distal portion of the tube and arranged at a first predefined distance of the first three marks of said set of marks,
the second set of marks comprises another set of three marks being arranged in cylindrical symmetry so that they are spaced substantially 120° angle apart in a second distal portion of the tube and arranged at a second predefined distance of the first three marks of said set of marks.

One advantage of this arrangement may ensure a detection and a reading of the tracking code of a tube when it will be introduced into the well.

In one embodiment each mark comprising the tracking code on the tube is:
an identification tags, such as RFID tag;
a barre code or a QR code printed on the surface of the tube.

DESCRIPTION

Definitions

The term "component" as used here means any element or accessory used to drill or operate a well. The component may, for example, be a relatively great length tubular element (approximately ten meters in length), for example a tubular, or a tubular coupling of several tens of centimeters in length, or indeed an accessory for these tubular elements (a hanger, a cross-over, a safety valve, a tool gasket, sub or the like). The component may be a pipe comprising one great length tubular element assembled with a coupling.

A component may comprise one connection or connector or indeed threaded end and intended to be coupled via a threading to another component in order to constitute a threaded tubular connection with this other component.

The components of the invention, such as tubes, are intended to be integrated into a final assembly in the well, this final assembly is called the "extraction structure" in the present description and noted $ST_1$. These components are generally connected one to another for dropping into the hydrocarbon well or similar wells. The extraction structure ST1 comprises all components intended to be introduced in a well, such as a drill stem, a casing string or liner string or indeed a tubing string, such as operating columns. For example, a typical well may comprise three casing strings of different diameters and lengths, and a liner string.

The terms "component", "tubular component" and "tube" are used interchangeably in the present description to refer to a piece of an extraction structure $ST_1$ in that the components are always going to be tubular pieces or substantially tubular pieces, or almost tubular pieces.

The term "job", noted Jb, refers to a task considering the preparation of an assembly: the extraction structure $ST_1$. A job also deals with its introduction in the well on the drill area. The introduction of the extraction structure $ST_1$ is made component $T_k$ by component $T_{k+1}$ following a predefined sequence $SEQ_1$. The definition of a job Jb1 implies the definition of a reference, called "job reference". All components which are concerned by the same extraction structure $ST_1$ entering in the well $W_1$ are referred in the job Jb1 by using a tally list.

A job is associated to the following list of items.
A contract number, CN. The contract number refers to the place where the well is built. The contract number CN may refer to a location, a geographical position, or any information allowing defining the area where the well is built.
A rig reference, which refers to a specific rig implemented in a chosen place where the well will be done. The rig may be a rig-type on the water or a on earth. Each rig-type may have specific features.
A tally reference, the tally is list of components and their associated features which will be introduced in the well.
Different actions that should be realized on each component.
A Job status: preparation, running, finish.

The tally, noted TAL, deals with all types of equipment to be introduced in a well $W_1$, such as drilling equipment, casing equipment, tubing equipment, etc. Each equipment listed in a tally $TAL_1$ is associated with other items that could be indicated in the tally:
a set of features indicating some properties of said component $T_k$;
a set of features indicating some properties of a list of components having interactions with others, such as a connection, a contact, a relative position;
a tracking code;
a job status: preparation, running, finish
an effective length;
an internal diameter;
a sequence number gives an indication of the order in which each component should be introduced in the well. Moreover, the sequence number give an information on the relation between a component and other components that it should be connected within;

The tally also comprises some indicators such as:
a cumulated length of a set of components $T_1$ which form a part of the extraction structure $ST_1$;
a mud gain MG expressed in cubic meter, this indicator may, for example, be extracted from another document or from a computed result from a computer, the indicator may be displayed and aggregated to the tally so that it could be considered that is a part of the tally;
the string inner volume SIV expressed in cubic meter, this indicator may also be extracted from another document or from a computed result from a computer, the indicator may be displayed and aggregated to the tally so that it could be considered that is a part of the tally.

The tally may be in different states as "pre-tally", or "running tally". One advantage is to generate a customized list of components $T_k$ depending on the place or the action to be taken on the component.

For instance, an operator on a rig place, such as site 40, needs to consult all components that are inside and outside the well W1. One advantage is to compute for example the cumulated length of the extraction structure at any time. Another advantage is the accuracy of the computed total length. This enables precise positioning of equipment along the structure, particularly equipment that could be attached to a specific tube.

In another example, an operator which is in site 30 would like to have the list of the components of specific job Jb1 in order to have a great attention to the last reparations. In this case, the operator does not need to access to the components which are already introduced in a well. In that objective, the operator, via a user interface, will request for a pre-tally for checking some actions.

Depending of the pre-tally of the tally list, a level of accuracy of the data describing the tubes may be documented in the local database.

According to an embodiment of the invention, an interface of a computer generates a list of the components $T_k$ of an extraction structure $ST_1$ of a predefined well $W_1$. A given job $Jb_1$ allows presenting the list of the components $T_k$ to be introduced into the well $W_1$ with an assigned order in a predefined sequence $SEQ_1$. The predefined sequence $SEQ_1$ ensures an operator that each action he will carry out on a component $T_k$ is done in a correct order. The sequence $SEQ_1$ is generated by a management tool that is accessible with a computer of an operator. The sequence $SEQ_1$ is recorded in the job $Jb_1$.

The sequence $SEQ_1$ allows generating an indicator relative to the integration of components in an extraction structure $ST_1$ before or during their introduction into the well $W_1$.

In that way, the sequence $SEQ_1$ is a powerful tool allowing an operator at each stage to plan the next actions on components $T_k$.

The invention allows offering an interface showing:
all components intended to be introduced into a given well $W_1$ and;
metrics and indicators automatically generated for controlling actions made on said components during drilling and completion operations.

This interface may give access to all or part of information of the tally $TAL_1$ and the associated job $Jb_1$ relative, and consequently to, for instance, the drilling equipment, or casing and tubing equipment to be used in the well which are documented in the Tally.

An advantage of the sequence SEQ 1 is to decrease errors made during the planning review of the installation of the extraction structure $ST_1$. Moreover, it allows generating indicators with different levels of accuracy depending on the desired objective to be completed. Consequently, the activity reports that could be automatically generated are facilitated.

A "local server" $SERV_{1i}$ is a server assigned to an area "i" or a site where tubular components may be stored and where data relative to tube features may be recorded. In such place a local database $DB_{1i}$ is associated to the local server $SERV_{1i}$. This local database $DB_{1i}$ may be the server memory or another memory.

In consequence, in the description of the present invention, it may be considered that a "local server" or a "local database" refers to the same network element having memory and accessibility capabilities such as a communication interface Ethernet, RJ45, optic fiber, etc.

Digital Descriptor

The digital descriptor $DD_1$ of a tube comprises a first set of data $SET_1$ which is stored in at least one memory $M_1$. The first memory $M_1$ is located at a central node of the network comprising different sub-networks. A first server $SERV_1$ manages a plurality of digital descriptor $D_k$ of a plurality of components Tk, such as tubes, in the central node. The first memory $M_1$ may be implemented in the server $SERV_1$ or may be distributed in different servers as a cloud architecture in the central node.

According to one embodiment, the first set of data $SET_1$ comprises different subsets of data $SET_{11}$, $SET_{12}$, $SET_{13}$, $SET_{14}$, In one example, the first subset of data $SET_{11}$ deals with geometrical data and comprises at least one of the following features:
a real outside diameter;
a nominal outside diameter;
a real internal diameter;
a nominal internal diameter;
a real weight;
a nominal weight;
a steel grade;
a drift diameter;
a real wall thickness;
a nominal wall thickness;
a minimum wall thickness;
a minimum wall thickness;
an effective length;
a material standard,
a maximal torque;
an optimal torque;
a minimal torque;
a minimal shoulder Torque;
a maximal shoulder torque;
a maximal delta turns;
a shoulder slope;
a make-up loss.

In one example, the second subset of data $SET_{12}$ comprises junctional component data. This subset $SET_{12}$ comprises at least one of the following features:
a connection type;
a total joint length (with another interface component;
an effective joint length total
a special clearance coupling,
a reduced coupling OD which reduces the tensile efficiency of the connection,
a special bevel to reduce risk of a coupling hanging up down the hole when having multiple strings in the same casing string, a match strength: modified couplings to achieve a 100% efficiency in tension, a dopeless: connection having a coating which allows the user not use dope to make-up the connections etc.

In one example, the third subset of data $SET_{13}$ comprises workflow data, such as logistical data. This subset $SET_{13}$ comprises at least one of the following features:

a pipe tracking code, TC;
a coupling tracking code, CTC;
a contract number, CN;
a manufacturer name, MN;
a manufacturing date, MD.

In one example, the fourth subset of data $SET_{14}$ comprises job data. This subset $SET_{14}$ comprises at least one of the following features:

a job reference Jb;
a sequential number $S_3$ in a job.

Figure 1:
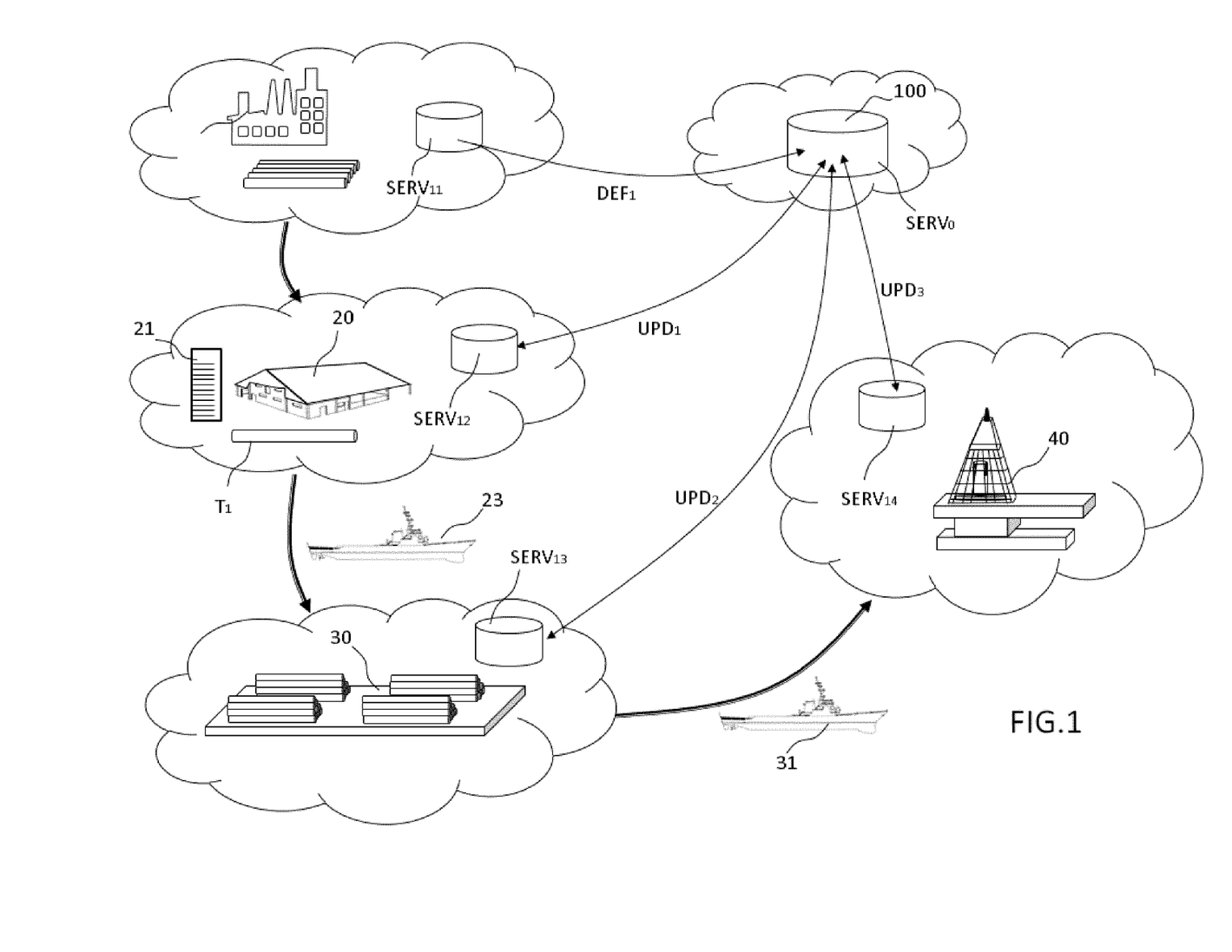
FIG. 1: is a schematic representation of the system of the invention according to an embodiment wherein fourth local servers are associated to different areas where a tube may be manipulated, repaired or selected so that it digital descriptor may be requested.

FIG. 1 represents the routing sequence of a tube $T_1$ of the invention starting from a production site 10 until to the site 40, such a well $W_1$, where the well $W_1$ is tube $T_1$ is introduced.

In FIG. 1, a production site 10, an equipment site of tubes 20, an inventory and repairing site 30 and a destination site 40 are represented. The invention is not limited to this site architecture. In different embodiments of the invention, a predefined tube may route from different sites before arriving in the destination site.

Figure 2:
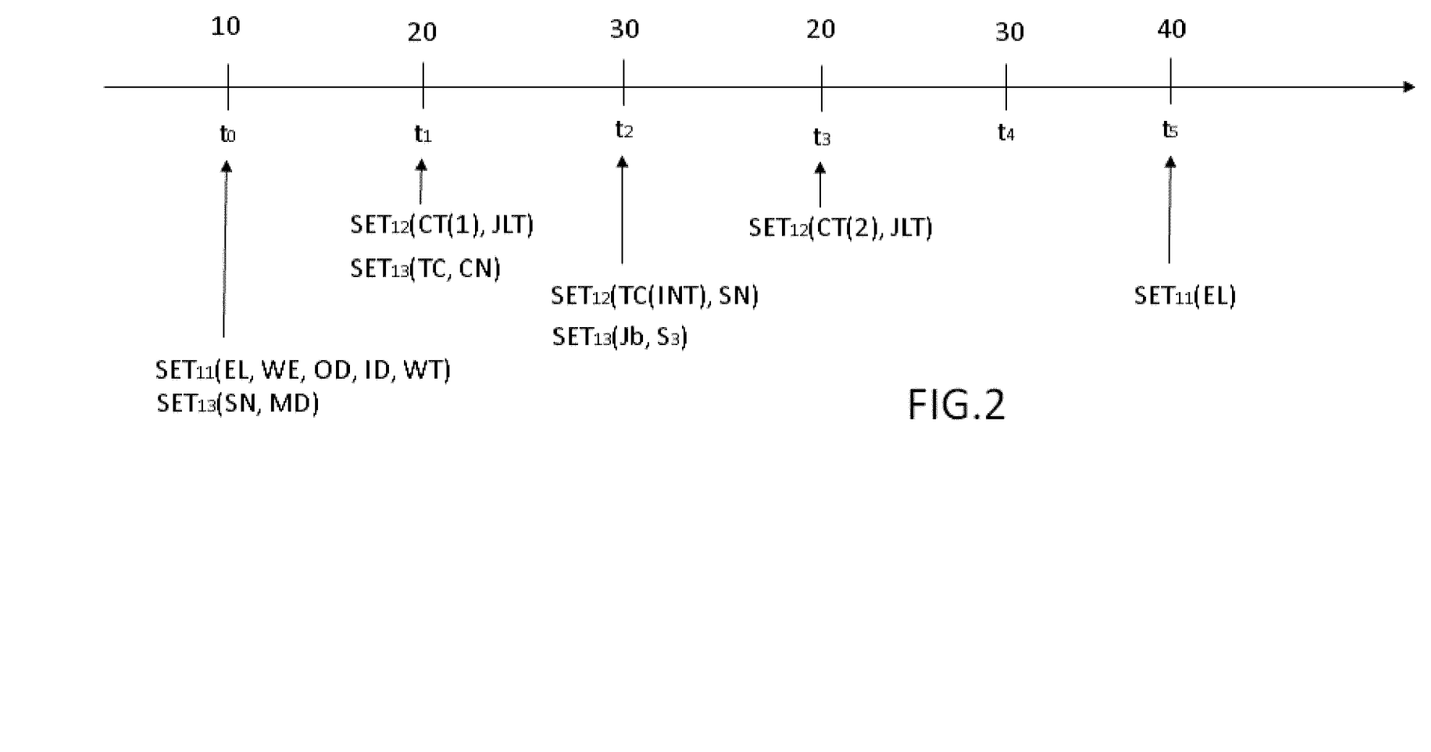
FIG. 2: is a time line representing different modifications of digital descriptor of a tube evolving in different sites, having different treatments, and being assigned to a specific job in a given place.

FIG. 2 illustrates an example of a routing sequence of a predefined tube $T_1$, called first tube $T_1$. At time $t_0$, the first tube $T_1$ is in site A for its production. At time $t_1$, the tube $T_1$ is transported into a second site 20 in order to be equipped with terminations to its ends. The tube $T_1$, for example, built in stainless steel grade may also be suited to specific surface treatment in site 20. The tube $T_1$ is then transferred, for instance by boat 23, at time $t_2$, in site 30 for completing an inventory step 21. Furthermore, at this stage, the tube $T_1$ may be assigned to a specific well $W_1$. In this site 30, checks and controls may be completed by an operator. In the example of FIG. 2, the tube $T_1$ is returned at time $t_3$ to site 20. At this stage, the tube T1 is adapted or repaired in order to be compliant with a specific need for example specified in a job datasheet relating to a specific well W1. After reparation or adaptation, the tube $T_1$ is sent at time $t_4$ to site 30 and then, it is delivered at time $t_5$, for instance by boat 3, to site 40. The site 40 if for example a well $W_1$.

In other routing sequence, a second tube T2 may be directly delivered from site 10 to site 40. All combinations of routes may be envisaged in the different embodiments of the invention.

Each area 10, 20, 30, 40, or other sites not described, where a tube $T_1$ may be transported comprises a local memory $M_1$ comprising a first set of data $SET_1$. The data describing said tube $T_1$ are intended to grow and they may be completed all along the routing and the actions fulfilled on said tube $T_1$.

In a preferred embodiment, the local memories are arranged in a server. In one example, each site 10, 20, 30, 40 comprises a local server $SERV_{11}$, $SERV_{12}$, $SERV_{13}$, $SERV_{14}$. In one embodiment, each server may be accessible via a wireless interface such as WIFI. A terminal such as a mobile device or a computer comprising a management interface may communicate with a server. In some embodiments, an authentication server (not represented) may be dedicated to secure transmissions between a terminal and a local server.

According to one embodiment of the invention each local server transfers automatically or manually the first set of data with a central server $SERV_0$. According to one embodiment, the first set of data may be recorded in a wearable memory which is then synchronized with the central server $SERV_0$. This scenario may happen when the local server $SERV_{14}$ is located at a rig, for example in the sea, without any wireless connection directly set with an access point. In such configuration, an operator may locally transfer the first set of data and then record the data in the central server $SERV_0$ from another site. According to an embodiment, when possible, periodically a local server transfers the first set of data to the central server or the central servers.

The transmitted data are associated to a timestamp. The central server SERV0 records the second set of data SET1 by processing a treatment which allows associating the data to a specific timestamp when necessary.

A production mill 10 can produce a variety of tubes $T_k$ at different external and internal diameters and with different wall thicknesses and sometimes with some shape variations. A set of mechanical features of each tube may be entered in the first local server $S_{11}$. FIG. 2 shows an example of what information could be stored in the server at the production of a tube $T_1$. For instance, the effective length EL, the weight WE, outside diameter OD, the internal diameter ID and the wall thickness may be defined in site 10 during or after the production of tube $T_1$. Other geometrical data may be recorded at this stage according to the different embodiments of the invention.

According to an embodiment of the invention the first set of data comprises workflow data $SET_{13}$ used to traceability and logistical purposes. In one embodiment, a tube $T_1$ comprises a serial number SN and a manufacturing date MD which are set in the first local server $SERV_{11}$ during or after the production of tube $T_1$. In other embodiments, other information may be recorded at this stage in the local server $SERV_{11}$.

In one embodiment, numerous features of each tubular component $T_k$ produced are basically obtained via quality control and through nondestructive testing operations at the production mill.

Connections are not necessarily manufactured immediately after the fabrication of the tube $T_1$ but they are made after at a finishing work facility next to the mill or distant from the mill in site 20. The invention allows considering both configurations: when connections are realized in the production mill 10 or in another site 20.

Most of time, a tube $T_1$ of the invention is specialized with a connection in another site, for example site 20, from the production site, as site 10. A tube $T_1$ is adapted, equipped or machined later with the appropriate features in function of the customer requirements and order. The second subset of data $SET_{12}$ comprising junctional data may be recorded in site 20 latter after the production of tube $T_1$. In the example of FIG. 2, the connection type CT(1) and the total joint length JLT of said tube $T_1$ with a specific connection is entered in the local server $SERV_{12}$ of site 20.

In site 20, other workflow data may be recorded in the server $SERV_{12}$ as for instance a tracking code TC and a contract number CN. In one embodiment, each workflow data is recorded in the local server 12 with an associated timestamp $t_1$.

The input data in the server $SERV_{12}$ are then synchronized with a central server $SERV_0$ in order to record all information in a central memory or a central database $DB_0$. In one embodiment, each workflow data that is transmitted to the central server $SERV_0$ is associated with an associated timestamp $t_1$ so that each recording recorded in the central server $SERV_0$ comprises each a timestamp.

In one embodiment, if there is a conflict between a workflow data that is already recorded in the central server $SERV_0$ and the same workflow data with a new value which is transmitted from a local server $SERV_{12}$ to the central server $SERV_0$ in order to be recorded, the invention allows managing the conflict by recording the same workflow data with the two different values by associating each workflow data to their timestamp: $t_0$, $t_1$.

After their manufacture, some tubular components are shipped to a stocking destination. In one embodiment, the tube $T_1$ is arriving in site 20 for being stocking, receiving a tracking code TC and optionally receiving adaptations, modifications or any customization for example as a thread at their ends or a specific connector or a coating treatment. In other examples, each tube Tk may receive specific adaptations, modifications or any customization in other stages of their routing.

One consequence is that some data from the second subset $SET_{12}$ from the first set of data $SET_1$ may be recorded in the local server $SERV_{12}$.

In the example of FIG. 2, the tube $T_1$ is modified to be prepared by receiving a connector $INT_1$ at each end. An operator is accessing to the local server $SERV_{12}$ via an interface for defining or updating the connection type TC of these connectors $INT_1$ and the total joint length JLT of the tube $T_1$ with said connectors. This operation is indicated with $SET_{12}(CT(INT_1), JLT)$ Following the routing sequence, the tube $T_1$ is transported in site 30. In site 30 an operator assigns a Job reference and a sequential number $S_3$ in the sequence $SEQ_1$ of said job. In this example, after an inspection, an operator indicates that a modification should be made on the connectors $INT_1$. An indication, such as $INT_M$, is recorded in the local database. The tube $T_1$ is routed to site 20 for being repaired or modified.

All data from the second and the third subsets $SET_{12}$ and $SET_{13}$ recorded in the local server $SERV_{12}$ are automatically transmitted to the central server $SERV_0$, for example by a backup storage planned every night at a predefined hour. In this operation, each data is recorded in the central server SERV0 with their timestamp $t_2$.

In one embodiment, tubular products $T_k$ can be sent to a location called rig prep, site 30 in FIG. 1, where the tubular products $T_k$ are prepared in view of their future use during a job on a yard or a rig such as site 40. Tubular components $T_k$ may stay in the well drilled and completed, or they can be sent back to rig prep, and be stocked for a future job or if need be, sent to a repair shop such as site 20.

In the example of FIG. 2, the tube $T_1$ is returned to site 20 for a change on the connectors $INT_1$, for example re-machining the thread of each connector $INT_1$ arranged at each end of the tube $T_1$. In this example, this operation leads to reducing the length of the total joint length JLT. The operation made, the operator set the new input in the local database, i.e. the local server $SERV_{12}$, by generating a command $SET_{12}(CT(INT_2), JLT_2)$. In that example, the notation $INT_2$ refers to the modified connector comprising a lengthening thread and JLT2 refers to the new total length of the Tube $T_1$ considered with their connectors.

Different reasons may justify some reparations of tubes. For instance, a repair shop which may not be controlled by the initial manufacturer or the final user of the tubular component may measure the tubular component's length, according to the international API standard, requiring a length measurement with an accuracy of plus or minus 30 mm, whereas the final user may need an accuracy of plus or minus 3 mm. For these reasons, tubular components may be prepared during rig prep on yard or rig at stage 30 or 40.

On every stage, some controls may be done on tubular component. Features may be updated following the controls during rig prep. Also, the tubular components can be repaired at repair shops or any manufacturing or maintenance facility, thus modifying some of the initial features measured at the production mill as it is illustrated with the example of FIG. 2.

In the example of FIG. 2, the Tube T1 is sent to site 30 at time t4 and then to the well site, site 40 at time t5. At time $t_5$ on the rig, an operator may modify a new feature, such as the effective length EL of tube T1 by measuring with an accurate method. In that example, the operator enters the new measured effective length in the local server $SERV_{14}$. That operation may be realized so as to determinate with a huge amount of accuracy the mud gain in the well $W_1$.

The geometrical data $SET_{11}$ may be updated at this stage in the local server $SERV_{14}$, such as the effective length EL. The data recorded in the server $SERV_{14}$ are then transmitted to the central server $SERV_0$, automatically or manually for their synchronization.

The invention provides a method and a system where updated features of the tubular products $T_k$ in a local place are recorded in a corresponding local database of the local server $SERV_{11}$, $SERV_{12}$, $SERV_{13}$, $SERV_{14}$. A local database contains local records relative to the tubular components $T_k$. A local record comprises a data representative of a tubular feature associated with a timestamp such as $t_1$, $t_2$, $t_3$, $t_4$, in example of FIG. 2. A local server $SERV_{1i}$ may send to a central database $SERV_0$ the local records. According to different embodiments, the sending of the local database can be done in real time or periodic.

In one embodiment, the local database $SERV_{1i}$ can be synchronized so that the local database receives central records from the central database $SERV_0$.

A local database of local server can be a mill database, a rig database, a repair shop database. In this last example, a local database can be a field service database. A field service means an accessory and repair shop which have capacities to machine connections. Indeed, tubular components $T_k$ may need repair after transportation or use, or an accessory can be manufactured starting from another component.

When measures are done on the tubular component $T_k$ or modifications are brought to the tubular component $T_k$ which modifies one or more features of the tubular components, then one or more local records representative of the one or more features are recorded into the local database $SERV_{1i}$ via a local user interface.

The synchronization of a local database, i.e. local server, $SERV_{1i}$ with the central database, i.e. local server $SERV_0$, can be done in real time when a communication interface allowing the central server to be accessible to the local server.

In one embodiment, during synchronization, for an item of the local database $DB_{1i}$, local records of local database $DB_{1i}$ is compared to central records of central databases $DB_0$. When there is no equivalent of a local record in local databases, then the local record is pulled out from local database $DB_{1i}$ to central database $DB_0$. In FIG. 2, in the site 10 at time t0, the effective length EL is set for the first time in the local database $DB_{1i}$. When this information is synchronized with the central database, the new entry is recorded in the central database $DB_0$.

In one embodiment, the invention also provides means such as a local database $DB_{1i}$ containing data representative of the central records of the central database $DB_0$. In one example, this local database $DB_{1i}$ may be configured to contain only a part of the items of the central database $DB_0$.

According to one embodiment, the remote database $DB_{1i}$ is synchronized with the central database $DB_0$, real time or periodically. Advantageously, the remote database $DB_{1i}$ contains the data relative to the tubular component $T_k$ in their latest known update. For instance, an operator in site 40 at time $t_5$, who controls by a user interface the connection type CT of tube $T_1$ will only see the connection type $CT(INT_2)$.

The central database $DB_0$ contains:
the features given by the mill 10 or by the repairing shop 20 having manufactured or adapted the tubular component $T_1$, and;
the updated data from a repair shop or a service company that have modified or controlled and measured features of the tubular component $T_1$, or from another remote/local database $DB_{1i}$.

The remote database $DB_{14}$ may correspond to a rig database, i.e. site 40, where measurements are done to verify tubular component characteristics. These measurements are then recorded in the remote database $DB_{14}$ as a remote record comprising a data representative of a tubular feature measured on the remote location 40 associated with a timestamp $t_4$.

The remote database $DB_{14}$ may send the remote records to the central database $DB_0$.

A rig, as site 40, is likely not having a stable data link as a rig can be offshore or in a desert, or it is not always possible to obtain a link through the network of the operator running the rig. The remote database may be synchronized periodically, for example after the job has been done.

A central database $DB_0$ contains data representative of central records from the central database at a first state, such as a state defined at time $t_0$. A central database $DB_0$ thus also may comprise data representative of remote records or local database under the form of central records at another state, for example records associated to another timestamp $t_3$.

During drilling and completion operations in site 30 or 40, casing and tubing are expected to be run in a hole as planned in the sequence recorded in the job datasheet. This sequence $SEQ_1$ ensures to guarantee well integrity and completion program.

The list of components necessary for casing and completing the well $W_1$ is prepared in a job datasheet. This job data sheet comprises the tally which may be used for preparing rig operations.

According to the invention, the tally comprises a pre-list $P\text{-}LIST_1$ that comprises a sequence $SEQ_1$ of what and when components are supposed to be introduced in the well $W_1$ with a predefined order. The differences between the prelist $P\text{-}LIST_1$ and the list $LIST_1$ of the job are set of tubular components that are already introduced in the well $W_1$.

The level of detail in the tally depends on the complexity of the well $W_1$. During running, this list is updated with the actual pipes lowered in well. The pre-list $P\text{-}LIST_1$ becomes the $LIST_1$. This list $LIST_1$ is also called the run-in-hole, RIH, tally and is used to check the compliance with the plan and to report activities.

The invention allows controlling the sequence dynamically ordered in the tally for reducing errors that are made in the last steps of introduction of components in the RIG. The invention allows reducing the changes or the returns in components intended to be introduced in the well which are not compliant with tally.

According to one embodiment, the invention takes advantage of marking tube $T_k$ with a tracking code $TC_1$ in order to synchronized changes in the management and the routing of tubular components from their manufacturing to their introduction into a well $W_1$.

According to one embodiment, the tracking code $TC_k$ of a component $T_k$ is paired with an identifier of said component $T_k$.

According to one embodiment, each tube $T_k$ intended to be introduced in a well is marked by a code physically marked on the surface of said tubes. According to one example, the marking is an optically readable marking such as a barcode, of the type of barcode 128 for instance, or a data matrix. In different embodiments, the marking is realized by painting, printing or by sticking a label on the surface of the tube $T_k$. According to another example, the marking is made by laser marking.

According to another embodiment, the marking on tube $T_k$ may be realized by a radio tag such as a RFID tag. The tracking code TC may be recorded on a passive or an active RFID tag for example sticking on the surface of the tube $T_k$.

At each stage of the routing of a tube $T_k$, an operator can read the tracking code TC using an optical sensor, or more commonly called a reader, such as a camera or a radio antenna such as a RFID reader.

In one embodiment, the reader is arranged on a mobile terminal such as mobile device, a smartphone, a tablet or any laptop computer being mobile.

In another embodiment, the reader is arranged in a predefined position such as to be well oriented when a tube $T_k$ is moving or is displacing in front of the camera.

Figure 3:
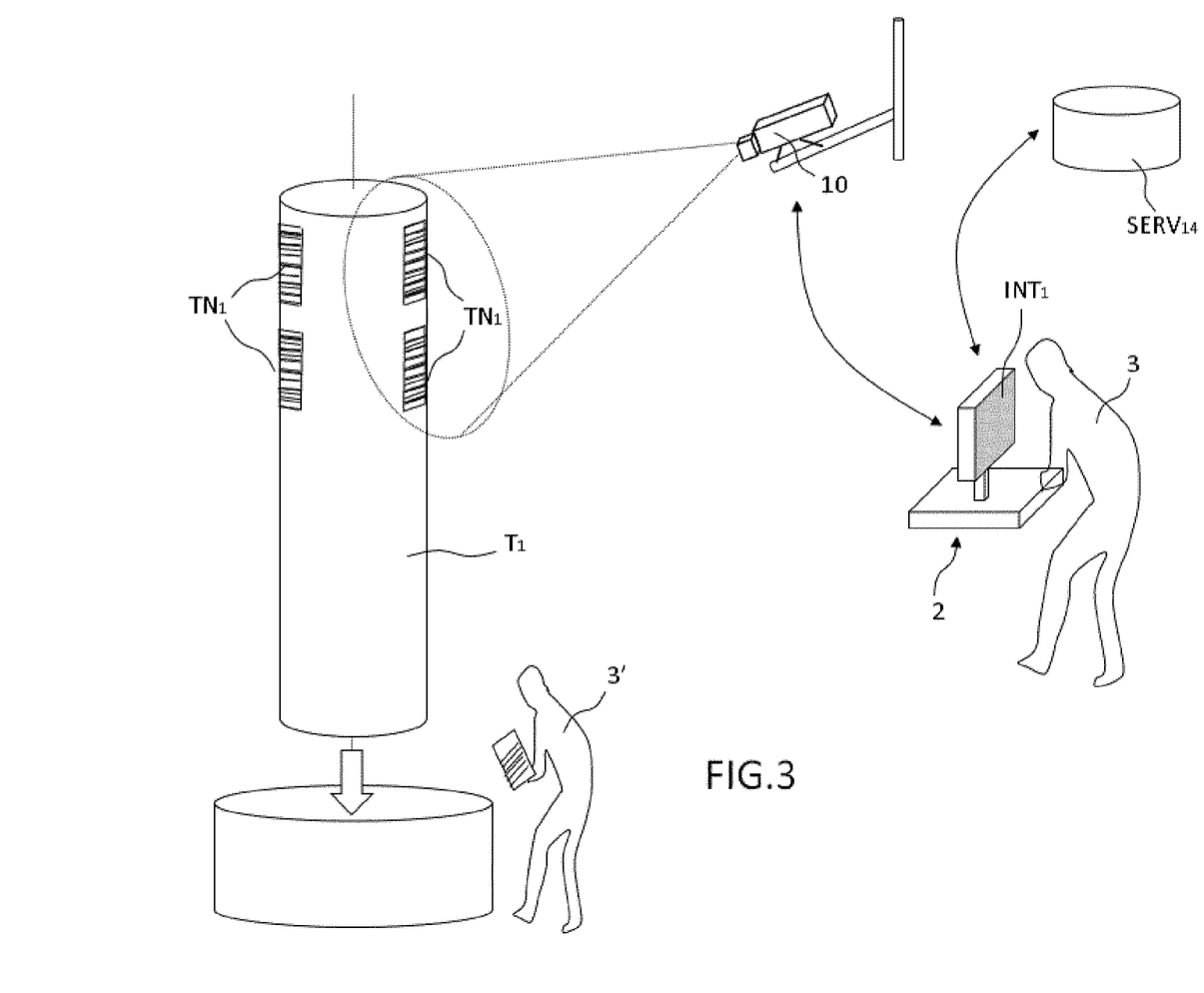
FIG. 3: is a schematic representation of a tube according to one embodiment of the invention, said tube being on the area where a control according to one embodiment of the invention is operated so that to verify the compliance between the digital descriptor so said tube and a predefined job datasheet indicating the use of said tube.

FIG. 3 represents a first tube $T_1$ having a marking on its surface. In that scheme, the first tube $T_1$ is close to be introduced into the well $W_1$. When the tube $T_1$ is upright standing over the well $W_1$, and takes a position, the camera 10 acquires the barcode $TC_1$. In this configuration, the camera may be placed in a range of 3 to 5 meters taking account of resolution and optical performance of lens.

In one embodiment, the camera 10 might be used in conjunction with IR or waveband selected light. One advantage is to define a solution compatible of the marking type.

In one configuration, the camera 10 is orientated downward, ability to read during rotation of the tube $T_k$.

In one embodiment, compatible presence centralizers, motion detector or any algorithm reinforcing the decoding of the tracking code may be used with the camera.

The barcode $TC_1$ is then decoded by a computer 2 which is connected to the camera 10. It is supposed that the camera comprised a communication interface in order to transmit the image to a local computer. An operator 3 may access through a software program and an interface 4 to the decoded barcode. The tracking code TC may be used so as to define an appropriated request to the local database $DB_{14}$, for instance by the way of the local server $SERV_{14}$.

The tracking code TC is used to recover all information relative to said tube $T_k$. Some geometrical information, workflow data or junctional data may be acquired in real time.

On advantage is to generate some indicators or metrics of the whole extraction structure $ST_1$ thanks to the exploitation of information of the current component $T_1$ which is analyzed.

Tube Marking

Preferably, the marking is placed at the end of the tubular component. In one embodiment, a marking is placed at each tubular end. In one embodiment, a plurality of markings is realized at each tubular end. For instance, two different markings are separated from 0.2 m along the axis of the tube $T_k$ as it is represented in FIG. 3. In one example, the markings are also separated from different angles, 120° in the FIG. 3. In one embodiment, the marking is 0.3 meters long.

Inventory Status

A first indicator that could be controlled with a reader acquisition is an identifier of the tube $T_1$. This first indicator allows checking an inventory status $S_0$ of a component $T_k$. The identifier may be the tracking code TC, or a unique identifier identifying said tube $T_1$. It could be the serial number SN for instance.

The acquisition of the tracking code TC thanks to the reader allows concluding in the fact that the tube $T_1$ has been previously be paired, for instance at stage 10 or 20.

This control allows generating a secure indicator $S_0$ $_{by}$ controlling each component manipulated in the rig 40. It may ensure that a previous component $T_n$ that have been removed from the local database $DB_{14}$, for instance because it was not exploitable (too much damages on the piece) is not reused by a wrong rerouting engaged by a human.

Moreover, the first indicator $S_0$ may ensure controlling the operation of inserting a tube $T_1$ into the well by checking that the marking is not defaulting, for instance, because of a muddy surface of the component $T_1$ that does not allow fully clear vision of the marking.

Completion Status

In another embodiment, a second indicator may be controlled by a reader acquisition. The second indicator deals with a completion status $S_1$. In one embodiment the completion status $S_1$ is an indicator set into the tally list. The second indicator may ensure that the tube is completed, it means according different embodiment that the following action(s) have been completed:
all necessary modifications are done on tube $T_1$ and/or;
the tube $T_1$ is equipped with all necessary junctional elements and/or;
a set of necessary checking and measurements have been done previously at previous stages by at least one operator.

In one embodiment, the completion status $S_1$ is analyzed regarding the value(s) of at least one feature of at least one subset of the first set of data $SET_1$.

In one example, the presence of connection type CT and the effective length EL are controlled. If their values are in a predefined scale, the completion status $S_1$ is favorably checked.

In another example, the total length with connectors is the unique parameter controlled for validating the completion status.

In the example of FIG. 3, a second operator 3' is controlling the tube $T_k$ by a visual checking. Some results from a visual checking, a measuring checking, electrical checking or any other controls may be recorded in the local database $DB_{14}$. The results are recorded by transmitting a new value of a feature or a compliance information. The invention allows recording all information recorded in the database $DB_{14}$ with a timestamp, for instance $t_4$. In one example, the second operator 3' measures an effective length of the tube $T_1$ which will be inserted in the well $W_1$. The measured value of the effective length of a tube by the operator 3' is then recorded in the database $DB_{14}$. The computer allows generating a timestamped recording in the local database $DB_{14}$.

Planification Status

In another embodiment, a third indicator $S_2$ is controlled by decoding the tracking code TC. The third indicator $S_2$ is a planification status. The planification status ensure an operator that the component is associated with a job reference.

The planification status may be defined as a specific feature in the fourth subset of data. The value of this specific value is then compared to the job reference of a job datasheet. The job datasheet may be described by a second set of data SET2. In one embodiment, this second set of data may be recorded in a second local database $DB_{24}$, for example in the site 40.

According to an embodiment, the results of the comparison generate a planification status.

Sequence Status

In another embodiment of the invention, a fourth indicator $S_3$ is controlled by decoding the tracking code TC. The third indicator $S_3$ is a sequence status. The sequence status S3 ensure to an operator that the introduction of the component $T_1$ in the well $W_1$ is well-ordered. If the number of component $T_1$ in the sequence $SEQ_1$ defined in the job Jb1 is 13, it means that the previous component that has been inserted in the well has the previous number in the sequence $SEQ_1$ which is 12.

One advantage is to reduce human errors, especially handling errors of tubes before they have to be introduced in the well $W_1$. Sometimes a junctional piece should be inserted, or a caging element should be inserted between two successive tubes of a main structure.

The invention allows reducing errors made by improper handling of a component which is not planned in the sequence $SEQ_1$.

The control of the third indicator $S_3$ may be realized automatically by recording the number of the last component $T_k$ which was carried out into the well $W_1$. In one example, the comparison of two successive number in the sequence may generate a planification status that can be easily checked by an operator on the interface of a computer.

Length Status

According to another embodiment, a fourth indicator is generated by decoding the tracking code TC.

The acquisition of the length of the tube $T_1$ may be used to compute a total current length of the extraction structure $ST_1$ integrating the first tube $T_1$. The acquisition may concern the total length or an effective length of a tube $T_1$.

The method of the invention allows extracting automatically the total length of the tube $T_1$ which is introduced and the current total length of the extraction structure $ST_1$ being already inside the well. In one embodiment, the current total length of the extraction structure $ST_1$ is recorded in a memory of the computer 2 or a memory of the local database $DB_{14}$. According to one embodiment, the current total length of the extraction structure $ST_1$ is updated at each new entry.

The length status of the whole structure allows ensuring a theoretical value that is calculated in the job datasheet. The values may be compared in order to generate a length status.

Mud Status

According to another embodiment, a fifth indicator is generated by decoding the tracking code TC.

The acquisition of the internal diameter $ID_1$ of the tube $T_1$, along with outside diameter $OD_1$ or wall thickness $WT_1$ may be used to compute a mud gain that could appear in the well after the introduction of said tube $T_1$.

The acquisition may concern the internal diameter $ID_1$ or the outside diameter $OD_1$ considering the value of the wall thickness $WT_1$.

The method of the invention allows extracting the mud gain value automatically from the internal diameter value $ID_1$ of the tube $T_1$ and the mud gain value previously calculated of the current structure which is already inside the well $W_1$. The invention allows surveying component by component the mud gain value by considering the current component intended to be inserted in the well W1 and the rest of the structure being inside the well.

In one embodiment, the current mud gain is recorded at each introduction in the well $W_1$ in a memory of the computer 2 or a memory of the local database $DB_{14}$. According to one embodiment, the current mud gain value of the extraction structure $ST_1$ is updated at each new entry.

The mud status may be generated by a comparison of an updating value being calculated at each iteration of the introduction of a new tube $T_1$ in the well $W_1$ and an expected value of mud gain that can be acquired from the job datasheet. This value is a theoretical value that could be calculated according to the well properties.

This allows detection of loss of apparent volume of mud in the well, and alert of possible crack in the well, or this either allows detection of gain of apparent volume of mud in the well.

Structure External Volume Status

According to another embodiment, a sixth indicator is generated by decoding the tracking code TC.

The acquisition of the outside diameter OD1 and effective length EL of the tube $T_1$ may be used to compute a structure external volume that is to be introduced in the well.

The structure external volume corresponds to the volume occupied by the extraction structure, without taking in account the interior free space in the volume calculation.

The acquisition may concern the outside diameter OD1 or the internal diameter $ID_1$ considering the value of the wall thickness $WT_1$.

The method of the invention allows extracting the extraction structure volume lowered in the well $W_1$ automatically from the outside diameter value $OD_1$ or from wall thickness $WT_1$ and internal diameter $ID_1$, and effective length EL of the tube $T_1$ and structure external volume value previously calculated of the current structure which is already inside the well $W_1$. In one embodiment, the current structure volume is recorded at in a memory of the computer 2 or a memory of the local database $DB_{14}$. According to one embodiment, the structure volume value is updated at each new entry.

Cement Status

According to another embodiment, a seventh indicator is generated by decoding the tracking code TC.

In a similar manner to structure external volume, the acquisition of the outside diameter OD1 of the tube $T_1$ may be used to compute a cement volume that could be introduced in the well for reinforcing the structure $ST_1$ that is built component by component.

The acquisition may concern the outside diameter OD1 or the internal diameter $ID_1$ considering the value of the wall thickness $WT_1$.

The method of the invention allows extracting the cement volume automatically to inject into the well $W_1$ from the outside diameter value $OD_1$ of the tube $T_1$ and the cement volume value previously calculated of the current structure which is already inside the well $W_1$. The invention allows surveying component by component the cement volume that should be introduced into the well by considering the current component intended to be inserted in the well $W_1$.

In one embodiment, the current cement volume is recorded at in a memory of the computer 2 or a memory of the local database $DB_{14}$. According to one embodiment, the cement volume value is updated at each new entry.

The cement status may be generated by a comparison between an updating value being calculated at each iteration of the introduction of a new tube $T_1$ in the well $W_1$ and an expected value of the cement volume that can be acquired from the job datasheet. This value is a theoretical value that could be calculated according to the well properties. This method allows a greater accuracy of the cement volume needed for the consolidation of the well structure.

In a variation, the cement volume is extracted from data about the well which are determined by the operator of the well, and from the structure external volume of the extraction structure.

Figure 4:
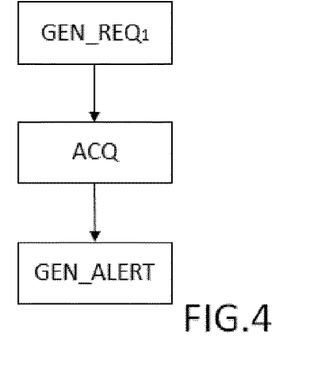
FIG. 4: is a first flow chart showing the main steps of one embodiment of the method of the invention, wherein an inventory status of the first tube and a completion status of the first tube are verified according to the digital descriptor of said tube.

FIG. 4 illustrates an embodiment of the method of the invention comprising three steps.

A first step comprises the definition and the transmission of a request $REQ_1$ from a user computer such a mobile device or work station to a local database $DB_{1i}$. In this step, the method gets an identification number of tube $T_1$. The identification number may be acquired by a camera of may be manually entered via an interface.

After generating a request REQ1, the local server transmits at least a first of data $SET_1$. In an embodiment, the local server transmits a second set of data $SET_2$ comprising at least the job datasheet. This last configuration may appear in site 30 or 40 for example.

The method comprises a step of receiving/acquiring data allowing generating at least one indicator, such as those defined previously. The method is noted ACQ. Different data may be received according different embodiments of the invention. The acquisition step may be automatically generated after reading a tracking code for instance. The acquisition may result on a form of displaying area on the computer showing a part of data acquired. The acquisition may point out in preference data that are in relationship with a customized request $REQ_1$.

A third step of the method comprises the generation of an alert, especially when the value of the indicator resulting from an operation of the received data is superior, inferior, equal or different from an expected value of a predefined range of values.

Figure 5:
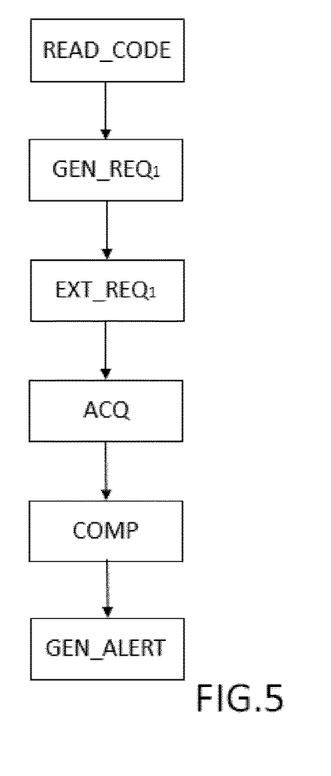
FIG. 5: is a second flow chart showing the steps of one embodiment of the method of the invention, wherein a value of geometrical data of junction data is verified according to a comparison between the digital descriptor and at least one input value.

FIG. 5 shows an embodiment of the invention where a preliminary step of reading a tracking code is led. This step may be conduced at each stage, i.e. in each site, where a local database DB ii is present. This step is called READ_CODE.

Figure 6:
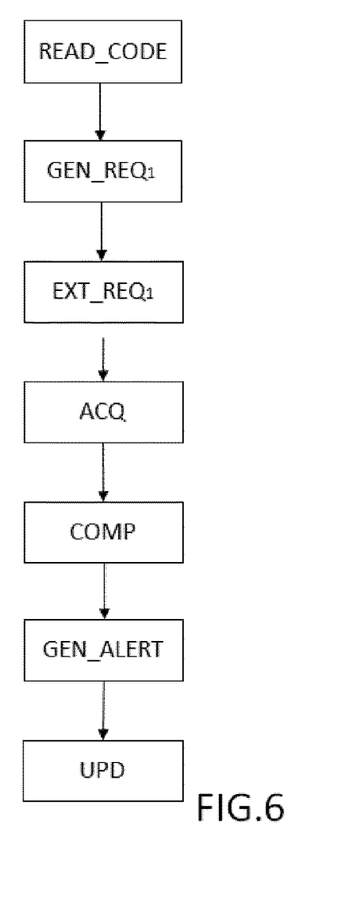
FIG. 6: is third flow chart showing the steps of one embodiment of the method of the invention, wherein it comprises an updating step of a value of a data of the digital descriptor in a local/central server.

FIG. 6 illustrates an embodiment where a step of updating a central database $DB_0$ is led. This step is called UPD. The updating of data in a central database $DB_0$ allows updating each local database BD1/ with current features of each tube $T_k$.

In one example modifications of a tube $T_1$ in site 20 may be recorded in the local database $DB_{12}$ and an update in the central database $DB_0$ may be then completed. When the tube $T_1$ arrives in site 30, the modified features of tube $T_1$ may be recovered in the local database $DB_{13}$ thanks to its synchronization with the central database $DB_0$.

One advantage of this step is proposing a method keeping up to date the values of features, modifications, adaptations, reports and checking of each component in each site. That ensures reducing errors, controlling the well integration of an extraction structure ST1 and reducing time to achieve such structure.

The invention claimed is:

1. A method for controlling a state of a first tube, said first tube being intended to be integrated in an extraction structure, a non-transitory computer-readable storage medium comprising computer-executable instructions which, when executed by a processor, cause a first server to perform a method of managing a digital descriptor of the first tube, said digital descriptor comprising a first set of data stored on at least a first memory, said first set of data comprising at least: one tracking code of the first tube and; a completion status and a planification status, wherein said method furthermore comprises: authenticating the first tube by capturing the tracking code of the first tube; generating a first request to the first server from a computer located near the first tube; acquiring an identification number in order to generate an inventory status of the first tube; acquiring a first value of the completion status of the first tube; acquiring a second value of the planification status of the first tube; generating at least one alert when the first or the second value is equal to a predefined state value.

2. The method according to claim 1, wherein the first set of data comprises at least:
   a first subset of geometrical data comprising at least one of the following features:
   an outside diameter;
   an internal diameter;
   a weight;
   a steel grade;
   a drift diameter;
   a wall thickness;
   a minimum wall thickness;
   an effective length;
   a material standard;
   a second subset of junctional component data comprising at least one of the following features:
   a connection type;
   a joint length total with another interface component;
   a third subset of workflow data comprising at least one of the following features:
   a pipe tracking code;
   a coupling tracking code;
   a serial number;
   a contract number indicating the position of the wells;
   a manufacturer's name;
   a manufacturing date;
   a fourth subset of job data comprising at least one of the following features:
   a job reference;
   a sequential number in a job.

3. The method according to claim 2, wherein the completion status is given for:
   a presence of at least one value in predefined fields of data of the first, the second and the third subsets of data of the first set of data; and/or,
   a specific field value of a completion status field in the first set of data.

4. The method according to claim 2, wherein the first server comprises: reading the tracking code on said first tube with an optic sensor or a radio antenna; modifying a data from the first subset of geometrical data or from the second subset of junction data of the first tube with a user interface; recording the modified data associated to a timestamp in the first memory; transmitting the modified data associated to the timestamp in a memory managed by the central server, said modified data being associated to the first tube in said memory; updating the digital descriptor of the first tube.

5. The method according to claim 1, wherein the planification status is given for: a presence of at least one value in predefined fields of data of fourth subsets of data of the first set of data; and/or, a specific value of a feature of the fourth subsets of data.

6. The method according to claim 1, wherein the first set of data comprises a job reference of a job datasheet, said job datasheet comprising a sequence number, wherein said method furthermore comprises: generating a second request to the first server from computer located near the first tube; extracting a job datasheet including a second set of data relating to a plurality of tubes, said plurality of tubes including the first tube; acquiring the sequential number of the first tube from the first set of data; comparing the sequential number of the first tube in said job datasheet with a sequential number of: another tube of the same job datasheet; the first tube being recorded in the first set of data; generating a second alert when the comparison of both sequential numbers is inferior or superior to a predefined threshold.

7. The method according to claim 1, wherein the first set of data comprises at least a fourth value of a geometrical feature of said tube, said method defining a geometrical status, said method comprising:
   acquiring a value of the first geometrical feature by a user interface;
   comparing the fourth value of the geometrical feature comprised in the first set of data with the acquired value of the first geometrical feature of the first tube;
   generating a third alert when the comparison of the two fourth values is superior or inferior to a predefined threshold.

8. The method according to claim 7, wherein:
   when the first geometrical value is the total length of the first tube, said method defining a length status, the method comprises the steps of:
   automatically calculating the cumulated length of tubes integrated in the extraction structure which have a sequential number inferior to the sequential number of the first tube;
   comparing the calculated cumulated length with a reference value recorded in the workflow data;
   generating an alert when said comparison is superior or inferior to a predefined threshold.

9. The method according to claim 7, wherein:
   when the first geometrical value is the internal diameter of the first tube, said method defining a mud status, the method comprises the steps of:
   automatically calculating an estimated mud gain value;
   comparing the calculated estimation of mud gain value with an expected mud gain stored in the workflow data;
   generating an alert when said comparison is superior or inferior to a predefined threshold.

10. The method according to claim 7, wherein: when the first geometrical value is the outside diameter of the first tube, said method defining a cement status, the method comprises the steps of: automatically calculating an estimated cement volume to be introduced; comparing the calculated estimation of cement volume with an expected cement volume stored in the workflow data; generating a second alert when said comparison is superior or inferior to a predefined threshold.

11. The method according to claim 1, wherein the acquisition of the data from the first memory comprises: reading the tracking code on the surface of the first tube by activating an optic sensor of a radio antenna; generating a request to the first server in order to extract at least a subset of the first set of data from the first memory; receiving the first set of data on a user device through a wireless interface.

12. The method according to claim 1, wherein the first server manages a plurality of memories in a cloud architecture, wherein a second set of data is stored on at least the first memory of the plurality of memories.

13. The method according to claim 1, wherein the first server periodically transmits the first set (SET1) of data to a central server.

14. The method according to claim 1, wherein the method comprises a preliminary step of pairing the first set of data with the tracking code.

15. The method according to claim 1, wherein the tracking code on the first tube is an identification tags or a marking being arranged on the surface of the first tube.

16. A computer program comprising instructions which, when the program is executed by a computer, cause the computer to carry out the method of claim 1.

\* \* \* \* \*